United States Patent
Pica et al.

(10) Patent No.: US 8,259,680 B2
(45) Date of Patent: Sep. 4, 2012

(54) APPARATUS AND METHOD FOR FACILITATING EFFICIENT HANDOVER

(75) Inventors: Francesco Pica, San Diego, CA (US); Duan Long, San Diego, CA (US); Andrea Garavaglia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 420 days.

(21) Appl. No.: 12/692,850

(22) Filed: Jan. 25, 2010

(65) Prior Publication Data

US 2011/0182271 A1 Jul. 28, 2011

(51) Int. Cl.
*H04W 4/00* (2009.01)

(52) U.S. Cl. .......................... 370/331; 455/437

(58) Field of Classification Search .................. None
See application file for complete search history.

(56) References Cited

U.S. PATENT DOCUMENTS

| | | | |
|---|---|---|---|
| 7,072,311 B1 * | 7/2006 | Czaja et al. | 455/437 |
| 2005/0070287 A1 | 3/2005 | Cave et al. | |
| 2007/0249355 A1 * | 10/2007 | Kang et al. | 455/439 |
| 2010/0124200 A1 * | 5/2010 | Ergen et al. | 370/331 |
| 2010/0124928 A1 * | 5/2010 | Ergen et al. | 455/436 |

FOREIGN PATENT DOCUMENTS

WO WO2009097070 A1 8/2009

OTHER PUBLICATIONS

3GPP TS 25.331 V 9.0.0 (Sep. 2009) 3$^{rd}$ Generation Partnership Project; Technical Specification Group Radio Access Network; Radio Resource Control (RRC); Protocol Specification (Release 9); sections 14.2.1.2 and 14.2.1.3.
International Search Report and Written Opinion—PCT/US2011/022473, ISA/EPO—May 25, 2011.

* cited by examiner

*Primary Examiner* — Steven H Nguyen
(74) *Attorney, Agent, or Firm* — Abdollah Katbab

(57) ABSTRACT

A method and apparatus facilitating efficient handover by a wireless communications device is provided. The method may comprise obtaining at least two handover metrics for a target cell and for a serving cell, wherein the at least two handover metrics are determined by a request received from the serving cell, determining if all the obtained handover metrics for the target cell are greater than or equal to corresponding threshold values, wherein the corresponding threshold values for the at least two handover metrics are determined by the request received from the serving cell, determining if at least one of the obtained handover metrics for the serving cell is less than the corresponding threshold value, and generating a measurement report indicating the target cell as a handover candidate cell.

21 Claims, 7 Drawing Sheets

APPARATUS AND METHOD FOR FACILITATING EFFICIENT HANDOVER

BACKGROUND

1. Field

The present application relates generally to wireless communications, and more specifically to methods and systems for using multiple handover metrics as a handover trigger for inter-frequency handovers.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, wideband code division multiple access (WCDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Further, in some WCDMA FDD multi-carrier (multi frequency) scenarios, inter-frequency handover based on user equipment (UE) event triggered measurement reports using either a received signal code power (RSCP) metric only or an energy per chip divided by a interference spectral density (Ec/No) metric only thresholds for the target frequency may not be optimal. For example, currently, 3GPP specifications define events 2b and 2c with only one type of target frequency quality threshold (RSCP or Ec/No). As such, under the current standard, a network may configure consecutive event 2b's or one event 2b followed by an event 2c to determine whether the target frequency quality fulfills multiple thresholds. As such, there is an increased risk of call drops due to fast degrading radio frequencies (RFs), delays associated with a radio network controller (RNC) sending a second event configuration message, or delays associated with transmitting a response to a second event configuration message.

Thus, improved apparatus and methods for facilitating efficient handover are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating efficient handover by a wireless communications device. According to one aspect, a method for facilitating efficient handover by a wireless communications device is provided. The method can comprise obtaining at least two handover metrics for a target cell and for a serving cell, wherein the at least two handover metrics are determined by a request received from the serving cell. Further, the method can comprise determining if all the obtained handover metrics for the target cell are greater than or equal to corresponding threshold values, wherein the corresponding threshold values for the at least two handover metrics are determined by the request received from the serving cell. Still further, the method can comprise determining if at least one of the obtained handover metrics for the serving cell is less than the corresponding threshold value. Moreover, the method can comprise generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

Yet another aspect relates to at least one processor configured to facilitate efficient handover by a wireless communications device. The at least one processor can include a first module for obtaining, by a wireless communications device, at least two handover metrics for a target cell and for a serving cell, wherein the at least two handover metrics are determined by a request received from the serving cell. Further, the at least one processor can include a second module for determining if all the obtained handover metrics for the target cell are greater than or equal to corresponding threshold values, wherein the corresponding threshold values for the at least two handover metrics are determined by the request received from the serving cell. Still further, the at least one processor can include a third module for determining if at least one of the obtained handover metrics for the serving cell is less than the corresponding threshold value. Additionally, the at least one processor can include a fourth module for generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

Still another aspect relates to a computer program product comprising a computer-readable medium. The computer-readable medium can include a first set of codes for causing a computer to obtain at least two handover metrics for a target cell and for a serving cell, wherein the at least two handover metrics are determined by a request received from the serving cell. Further, the computer-readable medium can include a second set of codes for causing the computer to determine if all the obtained handover metrics for the target cell are greater than or equal to corresponding threshold values, wherein the corresponding threshold values for the at least two handover metrics are determined by the request received from the serving cell. Still further, the computer-readable medium can include a third set of codes for causing the computer to determine if at least one of the obtained handover metrics for the serving cell is less than the corresponding threshold value. Still further, the computer-readable medium can include a fourth set of codes for causing the computer to generate a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

Yet another aspect relates to an apparatus. The apparatus can include means for obtaining, by a wireless communications device, at least two handover metrics for a target cell and for a serving cell, wherein the at least two handover metrics are determined by a request received from the serving cell. Further, the apparatus can comprise means for determining if all the obtained handover metrics for the target cell are greater than or equal to the corresponding threshold values, wherein the corresponding threshold values for the at least two handover metrics are determined by the request received from the serving cell. Still further, the apparatus can comprise means for determining if at least one of the obtained handover metrics for the serving cell is less than the corresponding threshold value. Moreover, the apparatus can comprise means for generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

Another aspect relates to an apparatus. The apparatus can include a handover module operable to: obtain at least two handover metrics for a target cell and for a serving cell, wherein the at least two handover metrics are determined by a request received from the serving cell, determine if all the obtained handover metrics for the target cell are greater than or equal to corresponding threshold values, wherein the corresponding threshold values for the at least two handover metrics are determined by the request received from the serving cell, determine if at least one of the obtained handover metrics for the serving cell is less than the corresponding threshold value, and generate a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

Still further, in accordance with one or more aspects and corresponding disclosure thereof, various aspects are described in connection with facilitating efficient handover by a serving base station. According to one aspect, a method for facilitating efficient handover by a serving base station is provided. The method can comprise obtaining an estimated service quality metric associated with the serving base station for a wireless communications device (WCD) and estimated service quality metrics associated with one or more target base stations for the WCD. Further, the method can comprise determining if the estimated service quality metric for the serving base station is below a threshold value and if the estimated service quality metric for at least one of the one or more target base stations is above a threshold value. Moreover, the method can comprise transmitting a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics.

Yet another aspect relates to at least one processor configured to facilitate efficient handover by a serving base station. The at least one processor can include a first module for obtaining a estimated service quality metric associated with the serving base station for a wireless communications device (WCD) and estimated service quality metrics associated with one or more target base stations for the WCD. Further, the at least one processor can include a second module for determining if the estimated service quality metric for the serving base station is below a threshold value and if the estimated service quality metric for at least one of the one or more target base stations is above a threshold value. Still further, the at least one processor can include a third module for transmitting a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics.

Still another aspect relates to a computer program product comprising a computer-readable medium. The computer-readable medium can include a first set of codes for causing a computer to obtain an estimated service quality metric associated with the serving base station for a wireless communications device (WCD) and estimated service quality metrics associated with one or more target base stations for the WCD. Further, the computer-readable medium can include a second set of codes for causing the computer to determine if the estimated service quality metric for the serving base station is below a threshold value and if the estimated service quality metric for at least one of the one or more target base stations is above a threshold value. Still further, the computer-readable medium can include a third set of codes for causing the computer to transmit a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics.

Yet another aspect relates to an apparatus. The apparatus can include means for obtaining an estimated service quality metric associated with the serving base station for a wireless communications device (WCD) and estimated service quality metrics associated with one or more target base stations for the WCD. Further, the apparatus can comprise means for determining if the estimated service quality metric for the serving base station is below a threshold value and if the estimated service quality metric for at least one of the one or more target base stations is above a threshold value. Still further, the apparatus can comprise means for transmitting a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics.

Another aspect relates to an apparatus. The apparatus can include a communications module operable to obtain an estimated service quality metric associated with the serving base station for a wireless communications device (WCD) and estimated service quality metrics associated with one or more target base stations for the WCD. Further, the apparatus can include a handover module operable to determine if the estimated service quality metric for the serving base station is below a threshold value and if the estimated service quality metric for at least one of the one or more target base stations is above a threshold value. Still further, the apparatus communication module may be operable to transmit a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident however, that such aspect(s) may be practiced without these specific details.

Generally, as a wireless communications device (WCD) moves through a wireless communications system, various base stations support service. In one aspect, a wireless communications system may be supported by multiple carriers and these multiple carriers may be providing service at various frequencies and from various base station locations throughout the system. As such, as the WCD moves through the system, handover over of service between various carriers may be beneficial to provide the WCD with uninterrupted service. Accordingly, various techniques for supporting handover of communications between such carriers are described herein.

Figure 1:
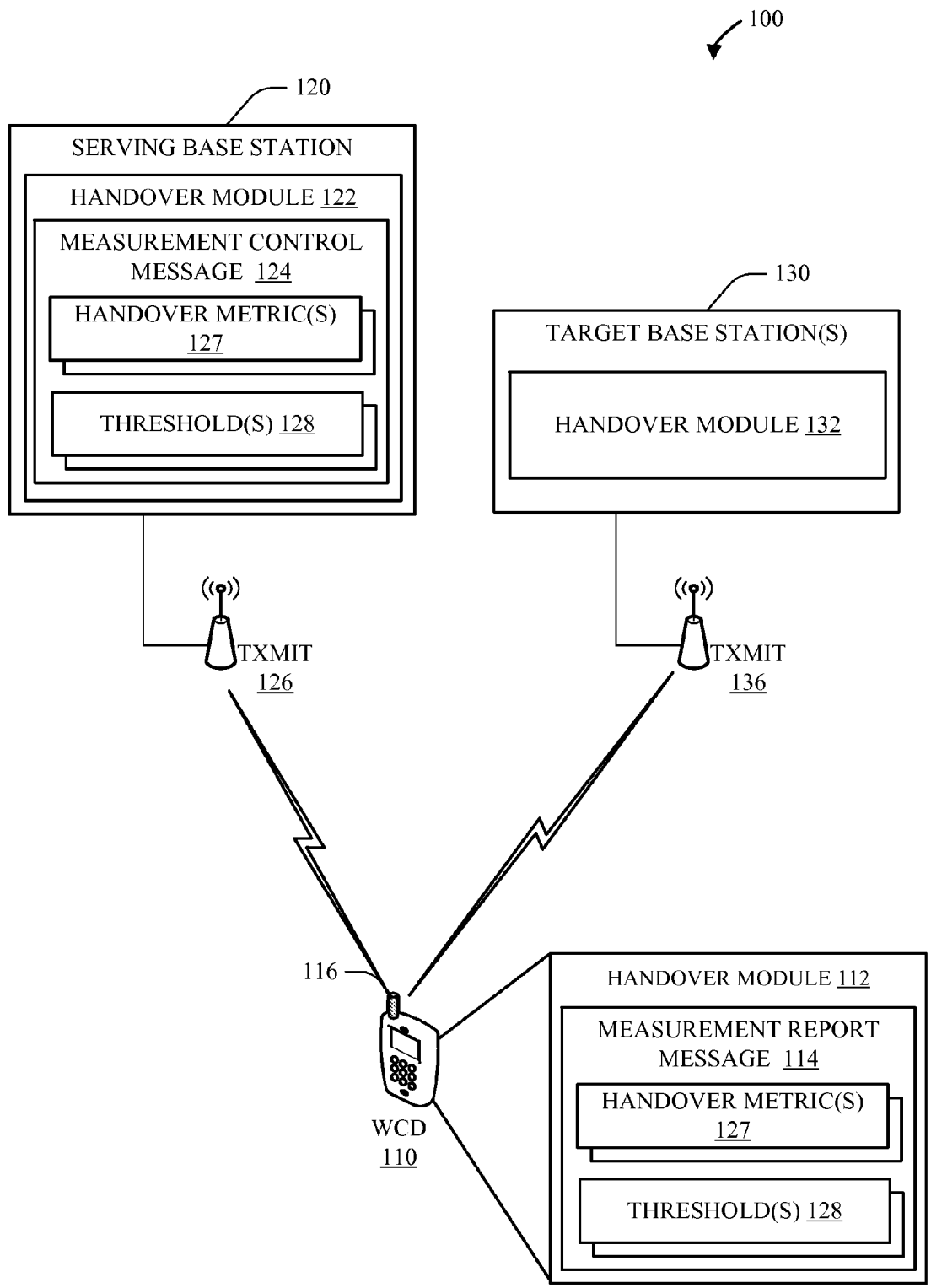
FIG. 1 illustrates a block diagram of a wireless communication system for facilitating efficient handover according to an aspect.

With reference now to FIG. 1, a block diagram of a system 100 for facilitating efficient handover in a wireless communication system is illustrated. System 100 may include serving base station 120, one or more target base stations 130, and one or more wireless communications device (e.g. terminals) 110, which can communicate via respective antennas 126, 136 and 116. In one aspect, base station 120 may function as an E-NodeB. In another aspect, serving base station 110 and at least one of the target base stations 130 may be co-located while using different, carriers, frequencies, etc.

In one aspect, serving base station 120 may include handover module 122, which may be operable to generate handover messages, such as measurement control message 124. In one aspect, measurement control message 124 may request terminal 110 to obtain multiple handover metrics 127 and compare the obtained metrics against multiple corresponding thresholds 128. In one such aspect, the handover metrics may include, a received signal code power metric (RSCP), an energy per chip divided by interference spectral density metric (Ec/No), a reference symbol signal to interference plus noise ratio (RS-SINR) metric, a reference symbol received power (RSRP), a received signal strength indicator (RSSI) metric, etc. Further, each metric request transmitted in the measurement control message may be associated with a corresponding threshold value. For example, a threshold value of negative 10 dB may correspond to the Ec/No metric, while a threshold value of negative 100 dBm may correspond to the RSCP metric. Further, in one aspect, where a serving base station 110 requests multiple handover metrics 127 to be obtained, the measurement control message may include a code indicating the handover metrics 127 to be obtained and additional fields for each corresponding threshold value 128.

In one aspect, serving base station 120 may conduct a downlink (DL) communication to terminal 110 via antenna 126. At the terminal 110, the DL communication may be received via antennas 116. In one aspect, serving base station 120 may determine a handover may be beneficial to the terminal 110. For example, serving base station 120 may estimate quality of service for a currently used frequency. Further, when the currently used frequency drops below a predetermined threshold, serving base station 120 may transmit a message prompting the WCD 110 to perform measurements on un-used frequencies. One such aspect may include use of a compression mode operation to assist in performing measurements on un-used frequencies. Further, serving base station 120 may process WCD 110 measurement reports and quality of service for an un-used frequency. Still further, in one aspect, when the currently used frequency drops below a predetermined threshold and the un-used frequency is above a predetermined threshold, serving base station 120 may transmit a message prompting the WCD 110 to perform inter-frequency handover.

In one aspect, terminal 110 may include handover module 112. In such an aspect, handover module 112 may be operable to receive messages from the serving base station 120 and perform measurements in response to received messages. For example, serving base station 120 may send measurement control message 122 to terminal 110, prompting the terminal to obtain handover metrics 127 requested in the measurement control message 122. Further, such obtained handover metrics may be compared with corresponding threshold values 128 provided in the measurement control message 122. In one aspect, (e.g. similar to an event 2b according the 3GGP standard) a measurement report message 114 may be triggered when equations (1) and (2) have been fulfilled.

$$Q_{Nonused} \geq T_{Nonused2b} + H_{2b}/2 \quad (1)$$

$$Q_{Used} \leq T_{Used2b} - H_{2b}/2 \quad (2)$$

Where, in equation (1), $Q_{Non\ used}$ is the quality estimate of a non-used frequency that may become better than an absolute threshold, $T_{Non\ used\ 2b}$ is the absolute threshold that may apply for a non-used frequency measurement, and $H_{2b}$ is a hysteresis parameter. Further, in equation (2), $Q_{Used}$ may be the quality estimate of the used frequency, $T_{Used\ 2b}$ is the absolute threshold that may apply for the used frequency measurement, and $H_{2b}$ is a hysteresis parameter. Further, if multiple target base stations 140 fulfill equations (1) and (2), a list of available non-used frequencies may be provided in the measurement report 114. In such an aspect, the list may provide the stronger un-used frequency at the top. In another aspect, (e.g. similar to an event 2c according the 3GGP standard) a measurement report message 114 may be triggered when only equation (1) has been fulfilled. Further, measurement report 114 may include an event identifier (e.g. event 2b, event 2c, etc., from the 3GPP standard).

Further, multiple conditions may occur in which a measurement control message 122 does not trigger a measurement report message 114. For example, if either equations (3) or (4) are fulfilled, a measurement report message 114 may not be sent.

$$Q_{Nonused} < T_{Nonused2b} - H_{2b}/2 \quad (3)$$

$$Q_{Used} > T_{Used2b} + H_{2b}/2 \quad (4)$$

Where, in equation (3), $Q_{Non\ used}$ is the quality estimate of a non-used frequency that may become better than an absolute threshold, $T_{Non\ used\ 2b}$ is the absolute threshold that may apply for a non-used frequency measurement, and $H_{2b}$ is a hysteresis parameter. Further, in equation (4), $Q_{Used}$ may be the quality estimate of the used frequency, $T_{Used\ 2b}$ is the absolute threshold that may apply for the used frequency measurement, and $H_{2b}$ is a hysteresis parameter.

In one aspect, system 100 may include one or more target base stations 130 which may include handover modules 132 so as to allow handover of service from serving base station 120. Further, in one aspect, target base stations 130 may use different frequencies than serving base station 120. In another aspect, target base stations 130 may be associated with different carriers than serving base station 120. In still another aspect, target base stations 130 may be accessible in different geographic regions than serving base station 120. For example, a target base station may provide service within a building into which the serving base station 120 signal may not penetrate.

In operation, serving base station 120 may communicate a measurement control message 124 to terminal 110. Thereafter, information communicated from base station 110 to terminal 120 may then be analyzed by handover module 112. In such an aspect, terminal 110 may obtain the requested handover metrics and compare the obtained metric values with corresponding threshold values. In another aspect, terminal 110 may conduct an uplink (UL) communication to base station 120 via antenna 116. At the base station 110, the UL communication may be received via antennas 126. In one aspect, the UL communication information may include a measurement report message 114. Thereafter, any messages communicated from terminal 110 to base station 120 may then be analyzed by a handover module 122. In one aspect, serving base station 120 may analyze measurement report message 114 and determine a target base station 130 may better serve the terminal 110. In such an aspect, serving base station 120 may transmit a handover command to terminal 110 to process a handover to a selected target base station 130.

As such, in wireless communications systems, such as multi-carrier systems, inter-frequency, (e.g. inter-carrier) handover may be triggered in an efficient manner with minimal signal loading on the system (e.g. use of only one measurement control message and one measurement report message). Further, implementation of such a process may involve minimal modifications to existing standards, such as the 3GPP standard, while allowing for backwards compatibly when implemented in a legacy system.

Figure 2:
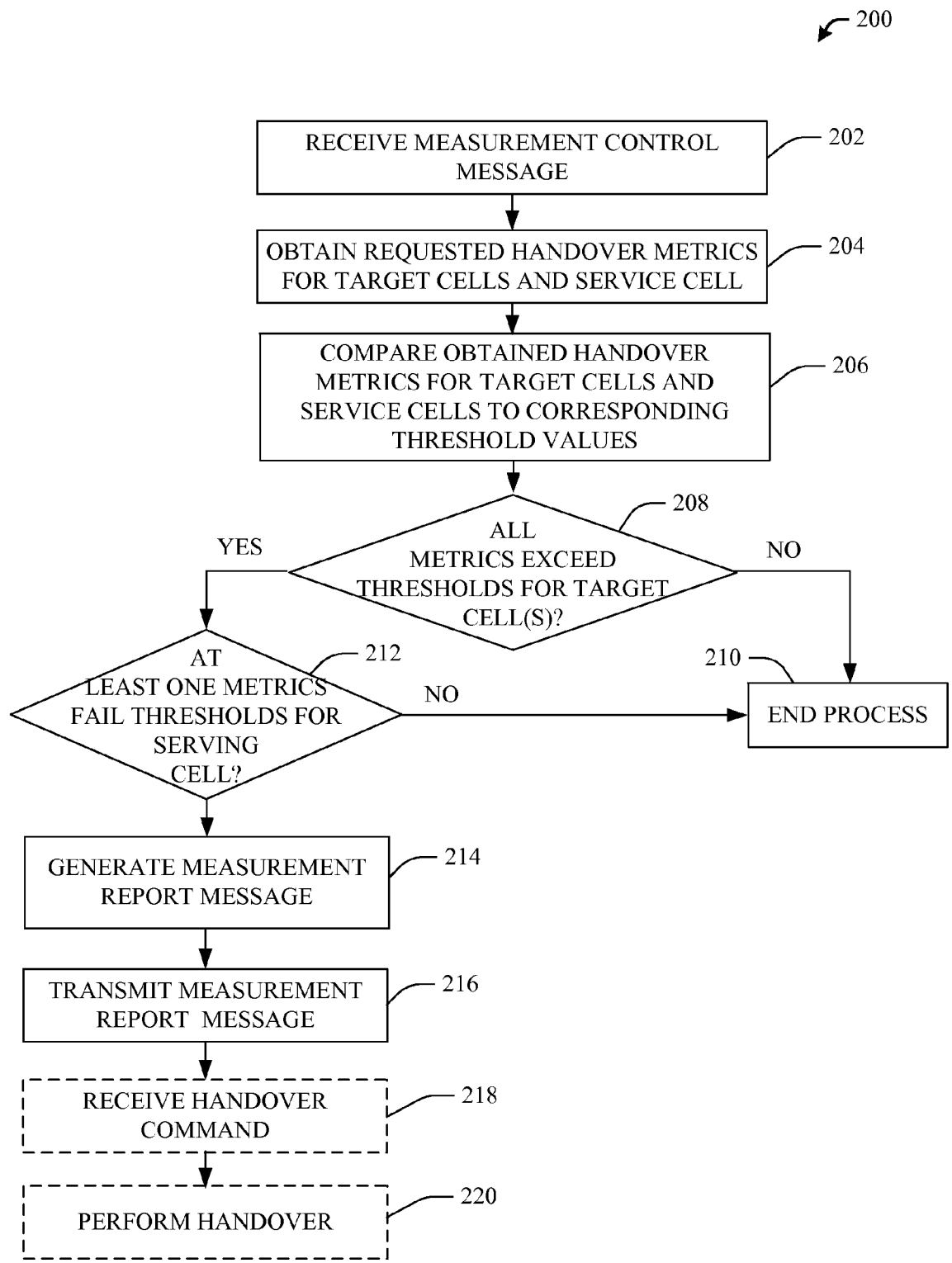
FIG. 2 depicts an exemplary flow diagram of a methodology for facilitating efficient handover according to an aspect.

FIG. 2 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 2, exemplary method 200 for facilitating efficient handover is illustrated. Generally, at reference numeral 202 a measurement control message, or the like, is received by a terminal. In one aspect, the measurement control message has been triggered by various conditions observed by a serving base station. For example, a serving base station may estimate quality of service for a currently used frequency and quality of service for at least one un-used frequency. Further, when the currently used frequency drops below a predetermined threshold and/or when the un-used frequency is above a predetermined threshold, the serving base station may transmit the measurement control message for the WCD to receive. In another aspect, the measurement control message may include a request for the WCD to obtain multiple handover metrics. For example, the handover metrics may include, a received signal code power metric (RSCP), an energy per chip divided by interference spectral density metric (Ec/No), a reference symbol signal to interference plus noise ratio (RS-SINR) metric, a Reference symbol received power (RSRP), a Received signal strength indicator (RSSI) metric, etc. Further, the measurement control message may provide a corresponding threshold value for each of the requested handover metrics.

At reference numeral 204, the requested handover metrics may be obtained for at least one target cell and the serving cell. As used herein, a cell may refer to a base station, a carrier, an accessible frequency band, etc. At reference numeral 206, obtained handover metric values may be compared with provided threshold values for at least one target cell. In one aspect, obtained handover metric values may also be compared with the provided threshold values for the serving cell.

At reference numeral 208, it is determined for each target cell whether all of the requested handover metrics have been fulfilled. In other words, whether all of the obtained handover metrics values for each target cell exceed the threshold provided. If at reference numeral 208, it is determined that none of the at least one target cell exceeds the threshold values for all of the obtained metrics, then at reference numeral 210 the process may terminate. By contrast, in one aspect, if the received measurement control message indicated a request for an event which only uses target cell metrics (e.g. an event 2c from the 3GPP standard), then upon a determination that at least one of the target cells exceeds the threshold values for all of the obtained metrics, a measurement report may be generated at reference numeral 214.

Additionally, by contrast, if at reference numeral 208, it is determined that the at least one of the at least one target cell exceeds the threshold values for all of the obtained metrics, then at reference numeral 210, it is determined whether at least one of the obtained metrics has failed for the serving cell. If at reference numeral 212, it is determined that none of the obtained metrics for the serving cell are below the provided thresholds, then at reference numeral 210, the process may terminate. By contrast, if at reference numeral 212, it is determined that at least one of the obtained metrics for the serving cell is below the provided threshold, then at reference numeral 214, a measurement report may be generated. In one aspect, if all the obtained metrics for multiple target cells have fulfilled the threshold values, then a list may be included in the generated measurement report including which target cells may provide the strongest signals, least interference, etc. Further, the generated measurement report may include an event identifier (e.g. event 2b, event 2c, etc., from the 3GPP standard). At reference numeral 216, the generated measurement report may be transmitted to the serving cell.

Optionally, assuming analysis of the measurement report by the serving cell prompts the serving cell to transmit a handover command, at reference numeral 218 a handover command may be received by the WCD. Thereafter, optionally, the WCD may perform the commanded handover at reference numeral 220.

Figure 3A:
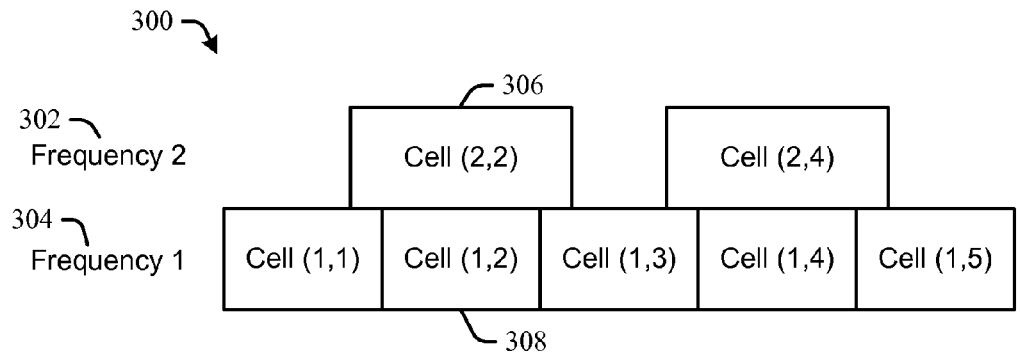
FIG. 3A depicts an exemplary block diagram of a wireless communication system with multiple carriers according to an aspect.
Figure 3B:
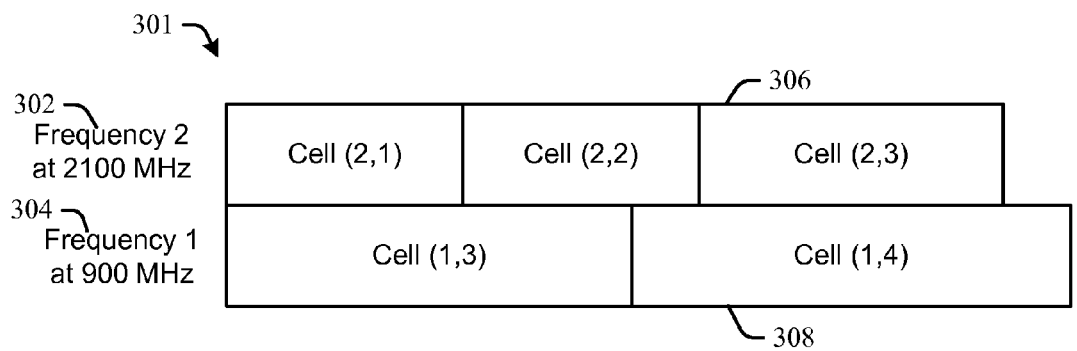
FIG. 3B depicts another exemplary block diagram of a wireless communication system with multiple carriers according to an aspect.
Figure 3C:
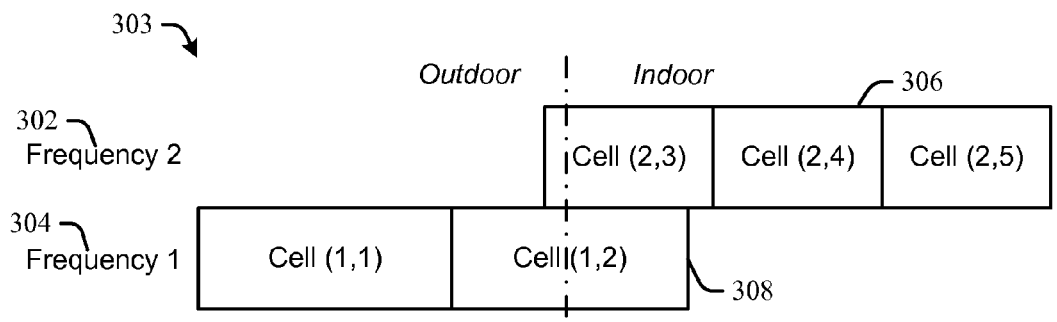
FIG. 3C depicts yet another exemplary block diagram of a wireless communication system with multiple carriers according to an aspect.

Turning now to FIGS. 3A, 3B and 3C, exemplary block diagrams of various wireless communication system configurations in which multiple carriers are present is illustrated. With reference to FIG. 3A, a wireless communications system 300 is depicted in which multiple carriers (302, 304) may provide service using different frequencies. For example, the first frequency 304 may supports cells 308 which may be available over a broader geographic region, while a second frequency 302 may support cells which provide hotspots for high speed packet access (HSPA) or the like. In such a depicted system 301, handover between cells may seem appropriate when only a single handover metric is used, but gaps in coverage may be seen when multiple handover metrics are analyzed. For example, a Ec/No metric may show service is good while a RSCP handover metric may show a steep drop off of available service as a terminal leaves the coverage region of a hotspot 306.

With reference to FIG. 3B, a wireless communications system 301 is depicted in which multiple carriers (302, 304) may provide service using different frequencies. For example, the first frequency 304 may supports cells 308 at a first comparatively lower frequency, such as 900 MHz, while the second frequency 302 may support cells 306 at a comparatively higher frequency, such as 2100 MHz. As can be seen in FIG. 3B, the higher frequency carrier may cover less of a geographic region than a lower frequency carrier. In such a depicted aspect, a single handover metric may not provide sufficient information to suggest a handover for a terminal that has reached the outer limits of coverage by a second frequency cell 306, while multiple handover metrics may allow for handover before signal quality deteriorates too quickly so as a call is dropped.

With reference to FIG. 3C, a wireless communications system 303 is depicted in which multiple carriers (302, 304) may provide service using different frequencies. For example, the first frequency 304 may supports cells 308 which may be available over a broader geographic region, while a second frequency 302 may support cells within a defined structure or the like. In such a depicted system 301, handover between cells may not seem appropriate when only a single handover metric is used, but limited penetration of coverage across a structure barrier may be seen when multiple handover metrics are analyzed. For example, a RSCP metric may show service is good while a Ec/No handover metric may show a steep drop off of available service as a terminal crosses a structural barrier.

Figure 4:
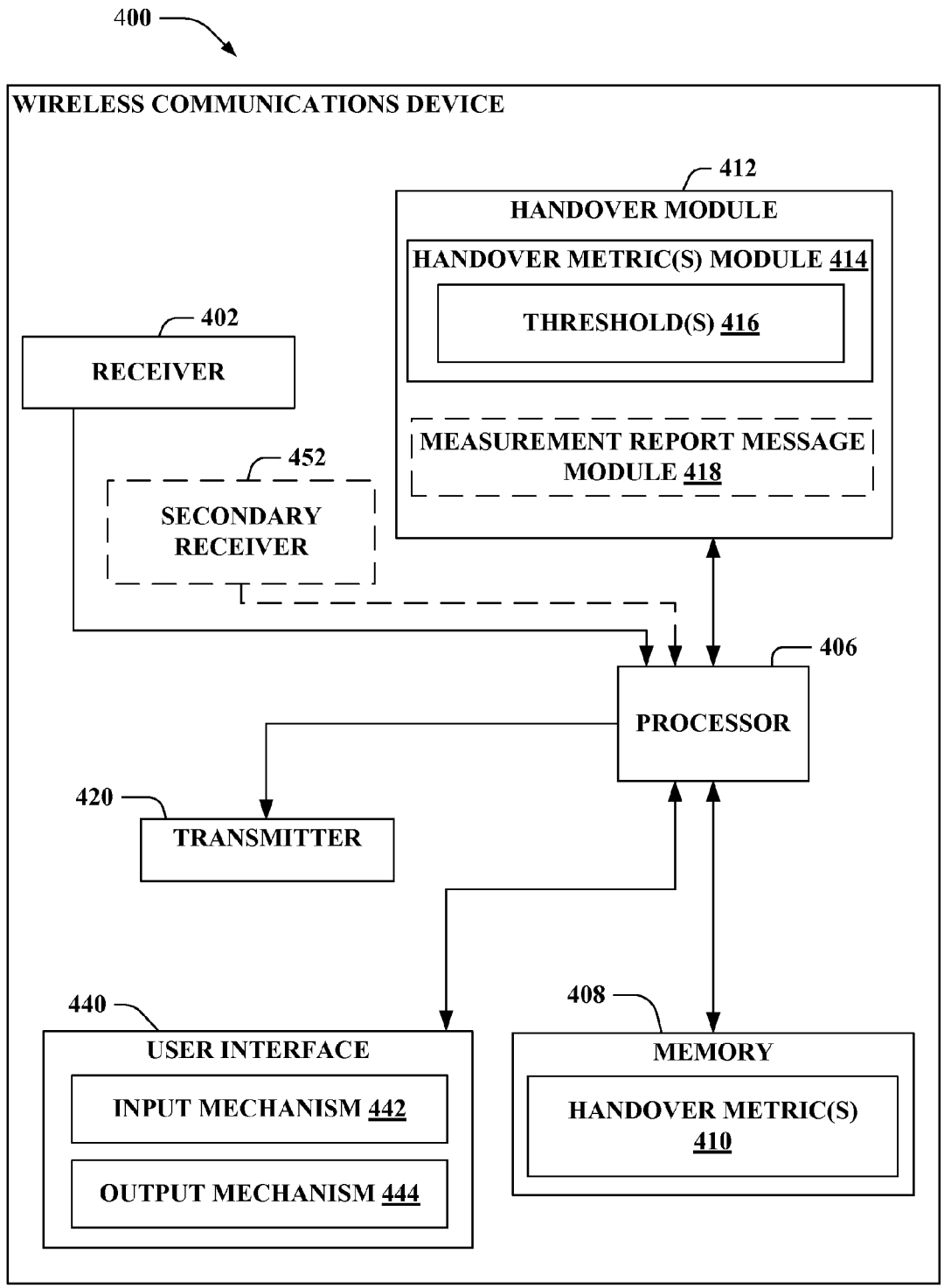
FIG. 4 depicts a block diagram of an exemplary wireless communications device that can facilitate efficient handover according to an aspect.

With reference now to FIG. 4, an illustration of a wireless communications device 400 (e.g. a client device) that facilitates efficient handover is presented. Client device 400 comprises receiver 402 that receives one or more signal from, for instance, one or more receive antennas (not shown), performs typical actions on (e.g., filters, amplifies, downconverts, etc.) the received signal, and digitizes the conditioned signal to obtain samples. Receiver 402 can comprise an oscillator that can provide a carrier frequency for demodulation of the received signal and a demodulator that can demodulate received symbols and provide them to processor 406 for channel estimation. In one aspect, client device 400 may further comprise secondary receiver 452 and may receive additional channels of information.

Processor 406 can be a processor dedicated to analyzing information received by receiver 402 and/or generating information for transmission by one or more transmitters 420 (for ease of illustration, only one transmitter is shown), a processor that controls one or more components of client device 400, and/or a processor that both analyzes information received by receiver 402 and/or receiver 452, generates information for transmission by transmitter 420 for transmission on one or more transmitting antennas (not shown), and controls one or more components of client device 400.

Client device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.). In one aspect, memory may include handover metrics 410 received from a serving base station. In such an aspect, handover metrics 410 may include a received signal code power metric (RSCP), an energy per chip divided by interference spectral density metric (Ec/No), a reference symbol signal to interference plus noise ratio (RS-SINR) metric, a reference symbol received power (RSRP), a received signal strength indicator (RSSI) metric, etc. Further, each handover metric 410 may be associated with a corresponding threshold value. For example, a threshold value of negative 10 dB may correspond to the Ec/No metric, while a threshold value of negative 100 dBm may correspond to the RSCP metric.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods is intended to comprise, without being limited to, these and any other suitable types of memory.

Client device 400 can further comprise handover module 412 to facilitate efficient handover. Handover module 412 may further include handover metrics module 414 operable to process received handover metrics 410. For example, a serving base station may send a measurement control message 418 to WCD 400, prompting handover metrics module 414 to obtain handover metrics 410 requested in the measurement control message. Further, such obtained handover metrics 410 may be compared with corresponding threshold values 416 provided in the measurement control message. Still further, in one aspect, (e.g. similar to an event 2b according the 3GGP standard) a measurement report message 418 may be triggered when equations (1) and (2) have been fulfilled, such as described above. In another aspect, (e.g. similar to an event 2c according the 3GGP standard) a measurement report message 418 may be triggered when only equation (1) has been fulfilled. For example, a measurement report message may be triggered depending on a quality and/or load of a currently used frequency falling below or increasing above a configured threshold. In another example, a measurement report may be triggered based on other events, such as congestion, etc. Further, measurement report 418 may include an event identifier (e.g. event 2b, event 2c, etc., from the 3GPP standard).

Additionally, mobile device 400 may include user interface 440. User interface 440 may include input mechanisms 442 for generating inputs into wireless device 400, and output mechanism 442 for generating information for consumption by the user of wireless device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, output mechanism 444 may include a display operable to present media content that is in image or video format or an audio speaker to present media content that is in an audio format.

Figure 5:
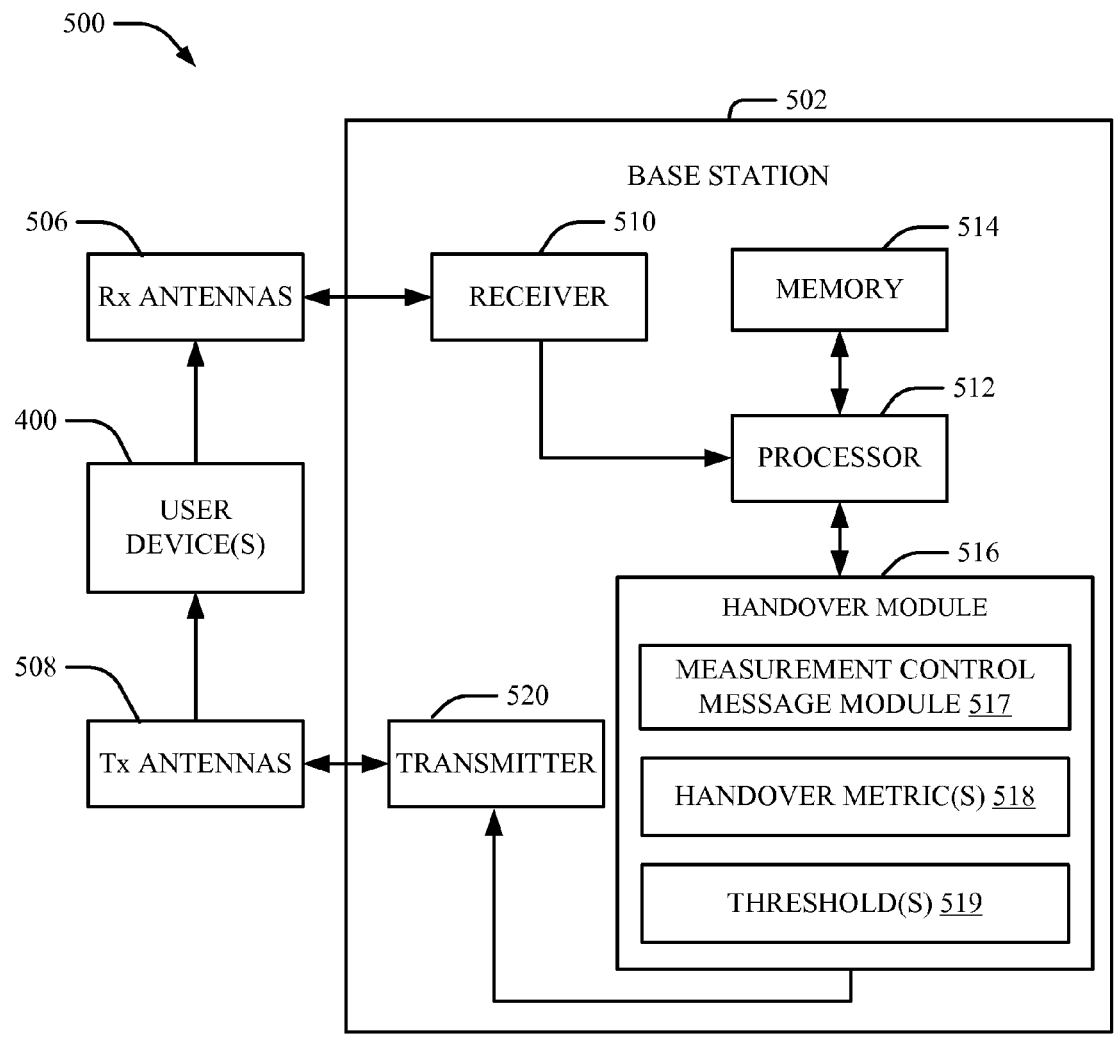
FIG. 5 is a block diagram depicting the architecture of a base station configured to facilitate efficient handover, according to another aspect.

With reference to FIG. 5, an example system 500 that comprises a base station 502 with a receiver 510 that receives signal(s) from one or more user devices 400 and or more or more carriers 504, through a plurality of receive antennas 506, and a transmitter 520 that transmits to the one or more user devices 400 through a plurality of transmit antennas 508. Receiver 510 can receive information from receive antennas 506. Symbols may be analyzed by a processor 512 that is similar to the processor described above, and which is coupled to a memory 514 that stores information related to wireless data processing.

Processor 512 is further coupled to a handover module 516 that facilitates efficient handover for a user device 400 between carriers in a multi-carrier wireless communications system. In one aspect, handover module 516 further includes measurement control message module 517 which may generate measurement control messages under certain circumstances. For example, measurement control message module 517 may prompt base station 502 to estimate quality of service for a currently used frequency and quality of service for an un-used frequency. Further, when the currently used frequency drops below a predetermined threshold and the unused frequency is above a predetermined threshold, measurement control message module 517 may prompt base station 502 may transmit a message prompting a user device 400 to perform measurements. In one aspect, a measurement control message may request for a user device 400 to obtain multiple handover metrics 518 and compare the obtained metrics against multiple corresponding thresholds 519. In one such aspect, the handover metrics 518 may include, a received signal code power metric (RSCP), an energy per chip divided by interference spectral density metric (Ec/No), a reference symbol signal to interference plus noise ratio (RS-SINR) metric, a reference symbol received power (RSRP), a received signal strength indicator (RSSI) metric, etc. Further, each metric request transmitted in the measurement control message may be associated with a corresponding threshold value. For example, a threshold value of negative 10 dB may correspond to the Ec/No metric, while a threshold value of negative 100 dBm may correspond to the RSCP metric. Signals may be multiplexed and/or prepared for transmission by a transmitter 520 through one or more transmit antennas 508 to user devices 400.

Figure 6:
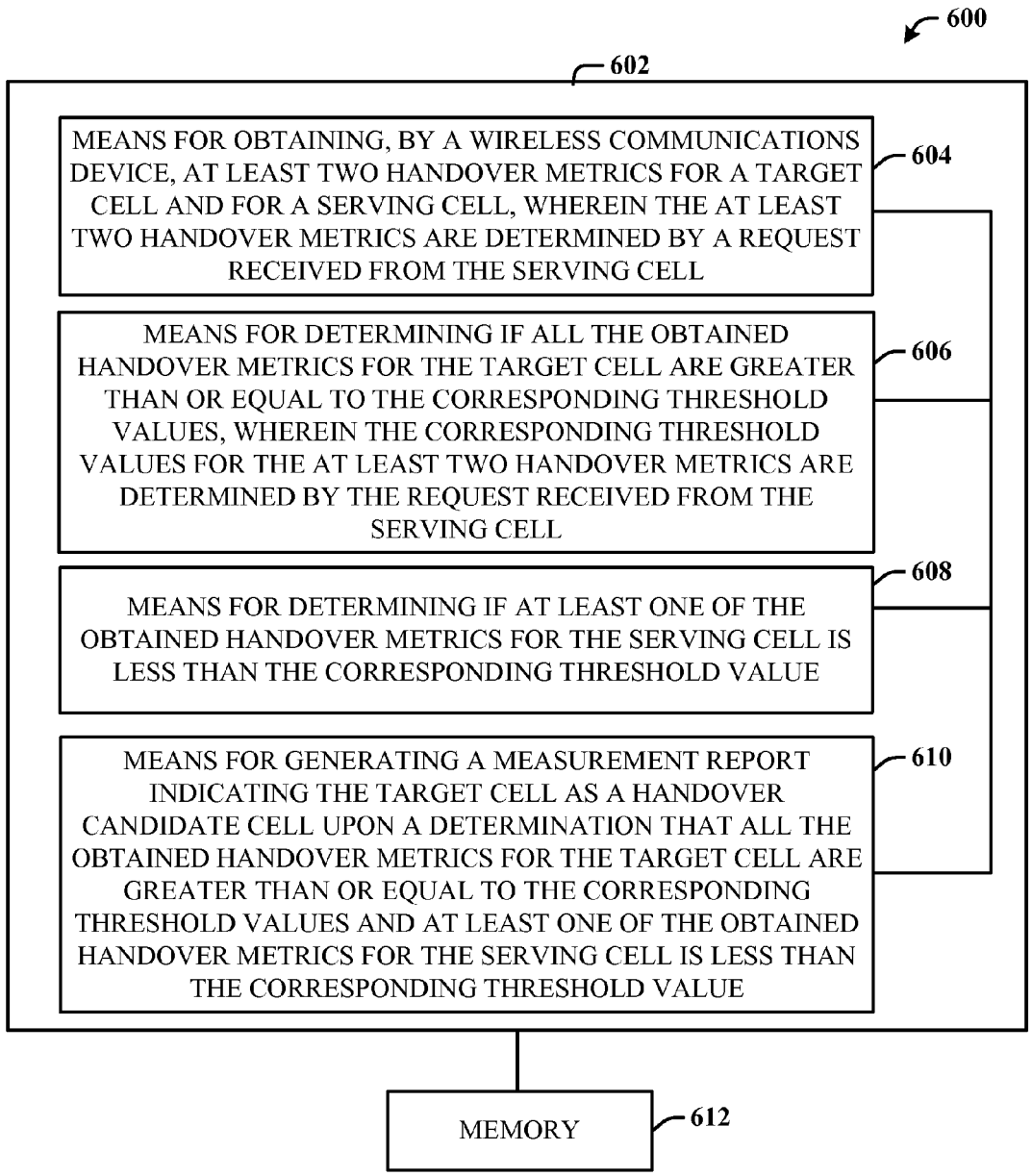
FIG. 6 depicts a block diagram of an exemplary communication system that can facilitate efficient handover according to an aspect.

With reference to FIG. 6, a block diagram of an exemplary system 600 that can facilitate efficient handover is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for obtaining, by a wireless communications device, at least two handover metrics for a target cell and for a serving cell, wherein the at least two handover metrics are determined by a request received from the serving cell 604. In one aspect, the handover metrics may include a received signal code power metric (RSCP), an energy per chip divided by interference spectral density metric (Ec/No), a reference symbol signal to interference plus noise ratio (RS-SINR) metric, a reference symbol received power (RSRP), a received signal strength indicator (RSSI) metric, etc. In one aspect, the serving cell and the target cell may be associated with different carriers. In another aspect, the serving cell and the target cell may be operable over different frequency bands. In still another aspect, the serving cell and the target cell may be accessible in different geographic regions.

Further, logical grouping 602 can comprise means for determining if all the obtained handover metrics for the target cell are greater than or equal to the corresponding threshold values, wherein the corresponding threshold values for the at least two handover metrics are determined by the request received from the serving cell 606. Still further, logical grouping 602 can comprise means for determining if at least one of the obtained handover metrics for the serving cell is less than the corresponding threshold value 608. Yet further, logical grouping 602 can comprise means for means for generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value Additionally, system 600 can include a memory 612 that retains instructions for executing functions associated with the means 604, 606, 608 and 610. While shown as being external to memory 612, it is to be understood that one or more of the means 604, 606, 608 and 610 can exist within memory 612.

Figure 7:
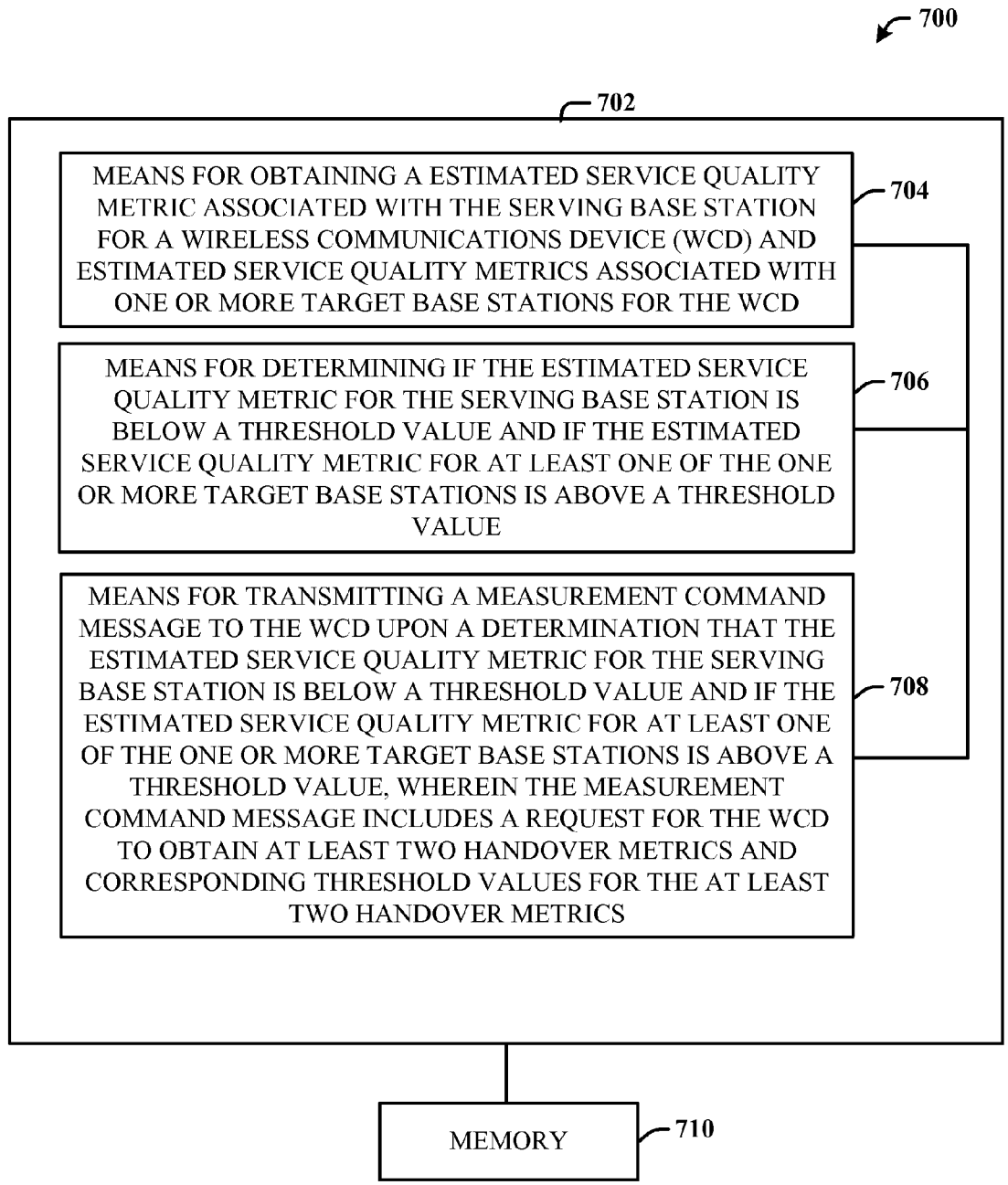
FIG. 7 depicts a block diagram of another exemplary communication system that can facilitate efficient handover according to an aspect.

With reference to FIG. 7, a block diagram of an exemplary system 700 that can facilitate efficient handovers is illustrated. For example, system 700 can reside at least partially within a base station, E-NodeB, etc. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include obtaining an estimated service quality metric associated with the serving base station for a wireless communications device (WCD) and estimated service quality metrics associated with one or more target base stations for the WCD 704. In one aspect, the serving cell (e.g. base station) and the target cell (e.g. base station) may be associated with different carriers. In another aspect, the serving cell and the target cell may be operable over different frequency bands. In still another aspect, the serving cell and the target cell may be accessible in different geographic regions.

Further, logical grouping 702 can comprise means for determining if the estimated service quality metric for the serving base station is below a threshold value and if the estimated service quality metric for at least one of the one or more target base stations is above a threshold value 706. Still further, logical grouping 702 transmitting a measurement command message to the WCD upon a determination that the estimated service quality metric for the serving base station is below a threshold value and if the estimated service quality metric for at least one of the one or more target base stations is above a threshold value, wherein the measurement command message includes a request for the WCD to obtain at least two handover metrics and corresponding threshold values for the at least two handover metrics 708. In one aspect, the handover metrics may include a received signal code power metric (RSCP), an energy per chip divided by interference spectral density metric (Ec/No), a reference symbol signal to interference plus noise ratio (RS-SINR) metric, a reference symbol received power (RSRP), a received signal strength indicator (RSSI) metric, etc.

Additionally, system 700 can include a memory 710 that retains instructions for executing functions associated with the means 704, 706 and 708. While shown as being external to memory 7010, it is to be understood that one or more of the means 704, 706 and 708 can exist within memory 710.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for facilitating efficient handover by a wireless communications device, the method comprising:
   obtaining at least two handover metrics for a target cell and for a serving cell, wherein the at least two handover metrics are determined by a request received from the serving cell;
   determining if all the obtained handover metrics for the target cell are greater than or equal to corresponding threshold values, wherein the corresponding threshold values for the at least two handover metrics are determined by the request received from the serving cell;
   determining if at least one of the obtained handover metrics for the serving cell is less than the corresponding threshold value; and
   upon a determination that all the obtained handover metrics for the target cell are greater than or equal to the corresponding threshold values and at least one of the obtained handover metrics for the serving cell is less than the corresponding threshold value, generating a measurement report indicating the target cell as a handover candidate cell.

2. The method of claim 1, further comprising:
   receiving, from the serving cell, a measurement command message, wherein the measurement command message includes the determined at least two handover metrics and the determined corresponding threshold values for the target cell; and
   transmitting the generated measurement report to the serving cell.

3. The method of claim 2, further comprising:
   receiving a handover command to prompt the WCD to handover service to the handover candidate cell in response to the transmitted measurement report; and
   performing a handover of service from the host cell to the handover candidate cell.

4. The method of claim 1, wherein the at least two handover metrics comprise:
   a received signal code power metric; and
   an energy per chip divided by interference spectral density metric.

5. The method of claim 1, wherein the serving cell and the target cell are associated with different carriers.

6. The method of claim 1, wherein the serving cell and the target cell are operable over different frequency bands.

7. The method of claim 1, wherein the serving cell and the target cell are accessible in different geographic regions.

8. The method of claim 2, wherein the measurement control message is triggered to be transmitted by the serving cell upon a determination that the quality of a currently used frequency has fallen below a corresponding threshold.

9. The method of claim 2, wherein the measurement control message is triggered to be transmitted by the serving cell upon a determination that a load of a currently used frequency has increased above a corresponding threshold.

10. At least one processor configured to facilitate efficient handover by a wireless communications device comprising:
a first module for obtaining, by a wireless communications device, at least two handover metrics for a target cell and for a serving cell, wherein the at least two handover metrics are determined by a request received from the serving cell;
a second module for determining if all the obtained handover metrics for the target cell are greater than or equal to corresponding threshold values, wherein the corresponding threshold values for the at least two handover metrics are determined by the request received from the serving cell;
a third module for determining if at least one of the obtained handover metrics for the serving cell is less than the corresponding threshold value; and
a fourth module for generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

11. A computer program product, comprising:
a non-transitory computer-readable medium comprising:
a first set of codes for causing a computer to obtain at least two handover metrics for a target cell and for a serving cell, wherein the at least two handover metrics are determined by a request received from the serving cell;
a second set of codes for causing the computer to determine if all the obtained handover metrics for the target cell are greater than or equal to corresponding threshold values, wherein the corresponding threshold values for the at least two handover metrics are determined by the request received from the serving cell;
a third set of codes for causing the computer to determine if at least one of the obtained handover metrics for the serving cell is less than the corresponding threshold value; and
a fourth set of codes for causing the computer to generate a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

12. An apparatus, comprising:
means for obtaining, by a wireless communications device, at least two handover metrics for a target cell and for a serving cell, wherein the at least two handover metrics are determined by a request received from the serving cell;
means for determining if all the obtained handover metrics for the target cell are greater than or equal to the corresponding threshold values, wherein the corresponding threshold values for the at least two handover metrics are determined by the request received from the serving cell;
means for determining if at least one of the obtained handover metrics for the serving cell is less than the corresponding threshold value; and
means for generating a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

13. A wireless communications device (WCD), comprising:
a handover module operable to:
obtain at least two handover metrics for a target cell and for a serving cell, wherein the at least two handover metrics are determined by a request received from the serving cell;
determine if all the obtained handover metrics for the target cell are greater than or equal to corresponding threshold values, wherein the corresponding threshold values for the at least two handover metrics are determined by the request received from the serving cell;
determine if at least one of the obtained handover metrics for the serving cell is less than the corresponding threshold value; and
generate a measurement report indicating the target cell as a handover candidate cell upon a determination that all the obtained handover metrics for the target cell are greater than or equal to the corresponding threshold values and at least one of the obtained handover metrics for the serving cell is less than the corresponding threshold value.

14. The WCD of claim 13, further comprising a communications module operable to:
receive, from the serving cell, a measurement command message, wherein the measurement command message includes the determined at least two handover metrics and the determined corresponding threshold values for the target cell; and
transmit the generated measurement report to the serving cell.

15. The WCD of claim 14, wherein the communications module is further operable to:
receive a handover command to prompt the WCD to handover service to the handover candidate cell in response to the transmitted measurement report; and
perform a handover of service from the host cell to the handover candidate cell.

16. The WCD of claim 13, wherein the at least two handover metrics comprise:
a received signal code power metric; and
an energy per chip divided by interference spectral density metric.

17. The WCD of claim 13, wherein the serving cell and the target cell are associated with different carriers.

18. The WCD of claim 13, wherein the serving cell and the target cell are operable over different frequency bands.

19. The WCD of claim 13, wherein the serving cell and the target cell are accessible in different geographic regions.

20. The WCD of claim 14, wherein the measurement control message is triggered to be transmitted by the serving cell upon a determination that the quality of a currently used frequency has fallen below a corresponding threshold.

21. The WCD of claim 14, wherein the measurement control message is triggered to be transmitted by the serving cell upon a determination that a load of a currently used frequency has increased above a corresponding threshold.

* * * * *